Aug. 9, 1927.
J. MÜLLER
WATER REGULATOR
Filed Oct. 5, 1925
1,638,053
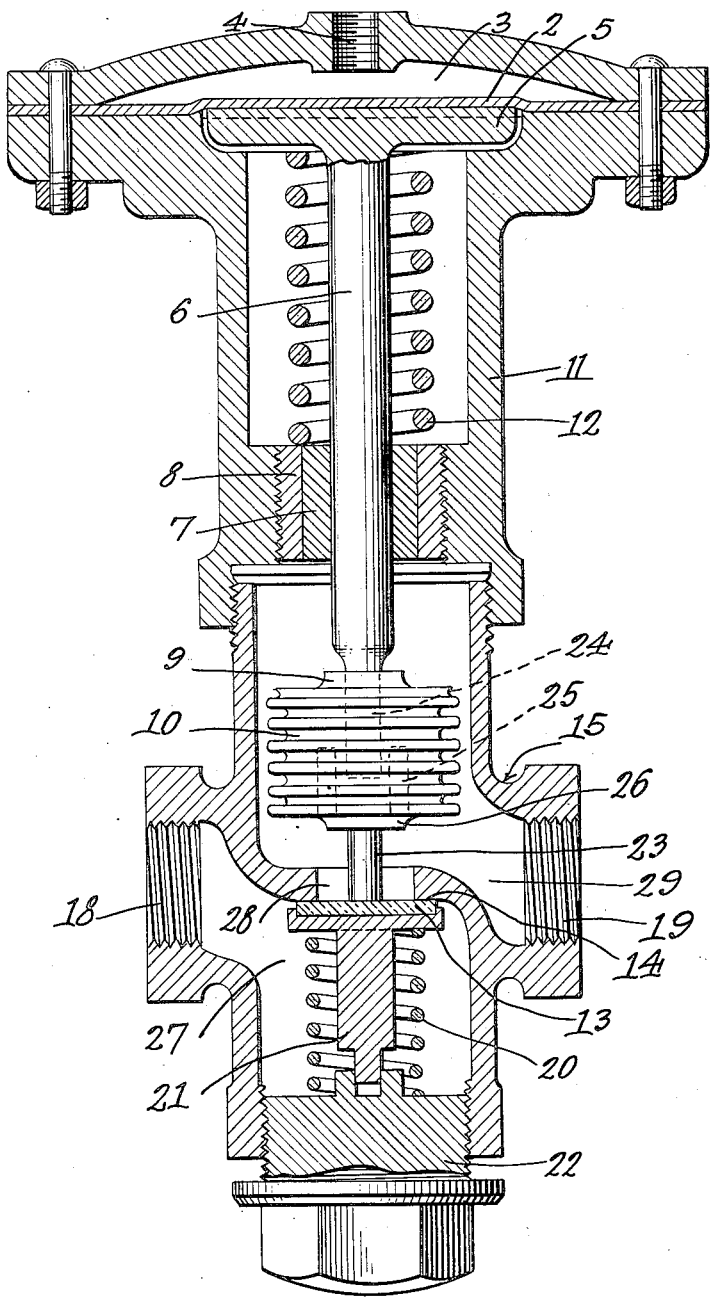
Joseph Müller Inventor
By C. A. Snow & Co.
Attorneys Patented Aug. 9, 1927.

1,638,053

UNITED STATES PATENT OFFICE.

JOSEPH MÜLLER, OF DAYTON, NEW JERSEY.

WATER REGULATOR.

Application filed October 5, 1925. Serial No. 60,544.

This invention relates to an improved water regulator especially designed for use for automatically regulating the flow of cooling water passing to the condenser of a refrigerating machine for air coolers, compressors and the like, where the cooling water is to be maintained at a certain desired predetermined temperature for cooling purposes.

Another object of the invention is to provide a regulator of this character having a thermostat operated by the temperature of the water passing through the valve forming a part of the invention to control the passage of water through the valve, and a diaphragm operated independently of the thermostat and controlled by the pressure fluid at the upper end of the device for operating the valve.

A further object of this invention is to provide a combined thermostatic and pressure controlled valve of such improved construction that the valve will be highly efficient in operation, which is strong and durable and which is of easy installation and which may be manufactured at a minimum cost.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

Referring to the drawing:

Te figure illustrates a longitudinal sectional view through the device.

Referring to the drawing in detail, the device includes a diaphragm 2 mounted in a chamber 3 being provided with a screw threaded central opening 4 for receiving a conduit from the source of fluid supply, the diaphragm 2 adapted to press against a head 5 of a valve pusher post 6, the post 6 being slidably journaled in a sleeve 7 and carrying a threaded member 8 and adapted to engage the terminal 9 of a thermostat 10, the sleeve 7 and member 8 being enclosed by a cylinder 11 connected with the member 8 by screw threads, the pusher post 6 being encircled by a helical spring 12 engaging the base of the head or foot 5, whereby the plunger 6 is yieldingly held as adjusted by the member 8 against the diaphragm 2 thereby operating by a varying pressure against the diaphragm 2 to push against the terminal 9 of the thermostat 10 and control a valve 13 seated upon a seat 14 in a cross valve 15, the cross valve 15 being provided with an inlet 18 and an outlet 19.

The valve 13 is yieldingly held against its seat by a spring 20 encircling a valve stem 21 the tension of the spring being adjusted by a plug 22. Embracing the stem 6 and the terminal 9 is a corrugated bellows 10 of suitable expansible material sensitive to temperature variations and adapted to expand and contract in a predetermined manner by the temperature of the fluid passing through the cross valve 15 and bearing against the shoulder 26.

As clearly shown the stem or plunged 6 passing through member 8 in the end of the cylinder 11 is adapted to engage a disk-like end 9 supporting the thermostat 10 depending from which disk 9 in integral form is a stub shaft 24 sleeved by a collar 25 the collar 25 upstanding in integral form from a disk-like terminal 26 supporting the lower end of the thermostat 10. The inlet conduit 18 passes downward at 27 and against the valve 13 and when the valve 13 is open, a circuit is provided through the opening 28 and thence through the chamber 29 in which is mounted the thermostat 10 and thence to the outlet conduit 19.

In operation ammonia from the discharge of the compressor of an ammonia ice machine enters chamber 3 through opening 4 and pipe not shown to force the diaphragm down, which engages head 5 carried by the plunger 6 which in turn engages the terminal 9 causing a movement of the plunger 6 against the end 9 of the thermostat. The stub shaft 24, the sleeve 25 and the depending stem 23 push the valve 13 from its seat 14, thereby permitting a passage of fluid through the opening 28 which however is independently controlled by the expansion and contraction of the thermostat 10 so that an independent pressure or a cooperative pressure may be had by the expansion of the thermostat 10 causing a movement of the valve 13 from its seat 14 or a retraction of the valve 13 from or against the seat 14 thereby providing a universal combined separate or selective movement of the valve 13 by the temperature and pressure by the diaphragm and thermostat. The general pressure is from five to ten pounds above the desirable pressure on the diaphragm, the purpose of this higher pressure being to open to a greater extent, the thermostatic control valve if necessary caused by unsuspected low pressure or shortage of water supply. The thermostat 10 opens and closes the valve independently of the diaphragm regulator and expands when the water gets warmer and supplies more water to the cooling medium and if the water gets cooler it closes the valve to a certain extent, and always on the same temperature whether the pressure in the main line increases or decreases. If the water runs cooler or warmer or if the condenser or compressor needs more or less water it always delivers the water for the cooling medium.

From the foregoing it will appear that a device of this construction will be very reliable and positive in its double operation and that the water is thus automatically maintained at a desirable predetermined temperature. It will also be noted that a device is of such a construction that it can be manufactured and sold as a unit for application to any cooling medium now employed on various devices or apparatus and does not require any modification or change in the structure.

I claim:—

In a device of the character described, a valve body having an inlet and an outlet opening, a partitioning member within the valve body and separating the inlet and outlet openings, said partitioning member having an opening establishing communication between the inlet and outlet openings, of the body portion, a spring pressed valve operating in the body portion and adapted to normally close the opening in the partitioning member, a rod carried by the valve and extending upwardly through the opening, an expansion element to which the rod is connected, a cylinder mounted on the valve body, a diaphragm mounted at one end of the cylinder, a rod having connection with the expansion element and having a head engaging the diaphragm, a coiled spring for normally urging the head upwardly against the diaphragm, to hold the valve normally seated, and said expansion element adapted to move to open the valve to allow fluid to pass through the valve body when the diaphragm moves to force the rod downwardly.

In testimony that I claim the foregoing as my own, I have hereto affixed my signature.

JOSEPH MÜLLER.